(12) United States Patent
Bray

(10) Patent No.: US 9,435,112 B2
(45) Date of Patent: Sep. 6, 2016

(54) ARTIFICIAL SURFACE DIVIDER

(71) Applicant: Patrick Dudley Bray, Trabuco Canyon, CA (US)

(72) Inventor: Patrick Dudley Bray, Trabuco Canyon, CA (US)

( * ) Notice: Subject to any disclaimer, the term of this patent is extended or adjusted under 35 U.S.C. 154(b) by 0 days.

(21) Appl. No.: 14/265,953

(22) Filed: Apr. 30, 2014

(65) Prior Publication Data

US 2014/0237927 A1 Aug. 28, 2014

Related U.S. Application Data

(63) Continuation of application No. 13/359,866, filed on Jan. 27, 2012, now abandoned.

(60) Provisional application No. 61/437,178, filed on Jan. 28, 2011.

(51) Int. Cl.
| | | |
|---|---|---|
| *E04B 1/38* | (2006.01) | |
| *E01C 13/08* | (2006.01) | |
| *E02D 5/80* | (2006.01) | |
| *B29C 47/00* | (2006.01) | |

(52) U.S. Cl.
CPC ............. *E04B 1/38* (2013.01); *E01C 13/08* (2013.01); *E02D 5/80* (2013.01); *B29C 47/003* (2013.01); *Y10T 428/24628* (2015.01)

(58) Field of Classification Search
CPC ...... A01G 1/08; E04D 13/15; E04D 13/155; E04D 2013/0468; E04D 2013/0472; E01C 11/221; E01C 13/00; E01C 13/08; E01C 13/083; E01C 13/10; E01C 5/20; E01C 15/00; E04B 1/38; E02D 5/80; Y10T 428/24628; B29C 47/003
USPC ........ 52/58, 60, 61, 62, 169.1, 169.2, 169.3, 52/565, 586.1, 608–610, 102, 244, 716.1, 52/716.3, 716.4, 718.01, 718.04, 718.05, 52/718.02, 717.03, 717.05, 717.06; 47/33; 404/7, 8; 16/4–7, 16, 17
See application file for complete search history.

(56) References Cited

U.S. PATENT DOCUMENTS

| | | | | |
|---|---|---|---|---|
| 2,115,868 | A * | 5/1938 | McIntosh | E04H 13/003 405/284 |
| 2,995,769 | A * | 8/1961 | Hill | A47G 27/0462 16/16 |
| 3,254,361 | A * | 6/1966 | Craven | A47G 27/0462 16/16 |
| 3,378,949 | A * | 4/1968 | Thomas | A01G 1/08 47/33 |
| 3,520,082 | A * | 7/1970 | Smith | 47/33 |
| 3,543,326 | A * | 12/1970 | Rohrberg | A47G 27/045 16/16 |
| 3,663,986 | A * | 5/1972 | Harby | A47G 27/0456 16/7 |
| 3,696,461 | A * | 10/1972 | Kelly | A47G 27/045 16/16 |
| 3,698,290 | A * | 10/1972 | Wallace | 404/7 |

(Continued)

FOREIGN PATENT DOCUMENTS

GB 1228767 A * 4/1971 ......... A47G 27/0462

*Primary Examiner* — Joshua J Michener
*Assistant Examiner* — Theodore Adamos
(74) *Attorney, Agent, or Firm* — Taft Stettinius + Hollister LLP; Anthony Filomena, II

(57) ABSTRACT

An artificial surface divider comprising a floor having a plurality of pads spaced apart from one another, the plurality of pads being mounted to a longitudinal housing having an overhang at least partially defining a longitudinal channel and a longitudinal gap that is open to the longitudinal channel, the longitudinal gap extending between an edge of the overhang and a floor of the longitudinal housing, where a longitudinal dimension of the artificial surface divider is the dominant dimension.

24 Claims, 12 Drawing Sheets

(56) References Cited

U.S. PATENT DOCUMENTS

| | | | | |
|---|---|---|---|---|
| 4,349,596 A * | 9/1982 | Hendrix | | 428/83 |
| 4,653,138 A * | 3/1987 | Carder | | A47G 27/0462 16/16 |
| 4,682,925 A * | 7/1987 | Shields | | A47C 21/022 16/16 |
| 4,966,370 A * | 10/1990 | Morris | | A63B 47/02 273/127 B |
| 5,315,780 A * | 5/1994 | Thomas | | A01G 1/08 47/33 |
| 5,640,801 A * | 6/1997 | Rynberk | | A01G 1/08 404/7 |
| 5,647,692 A * | 7/1997 | Gunter | | 405/119 |
| 5,653,553 A * | 8/1997 | Gunter | | E01C 13/00 273/DIG. 13 |
| 5,661,874 A * | 9/1997 | Latour | | A47G 27/0462 16/16 |
| 5,694,723 A * | 12/1997 | Parker | | 52/169.5 |
| 5,857,288 A * | 1/1999 | Wiste | | 47/33 |
| 5,930,947 A * | 8/1999 | Eckhoff | | A01G 1/08 47/33 |
| 6,038,733 A * | 3/2000 | Carder | | A47G 27/0462 16/16 |
| 6,379,078 B1 * | 4/2002 | Zwier | | 404/7 |
| 6,725,617 B2 * | 4/2004 | Cox | | 52/408 |
| D543,286 S * | 5/2007 | Keeley | | D25/119 |
| D586,005 S * | 2/2009 | Schumaker et al. | | D25/119 |
| 7,963,718 B2 * | 6/2011 | Zwier et al. | | 404/7 |
| 2002/0139045 A1 * | 10/2002 | Womack | | E02B 3/00 47/33 |
| 2005/0189723 A1 * | 9/2005 | Chassee | | A47G 27/045 277/411 |
| 2006/0008327 A1 * | 1/2006 | Womack | | 405/270 |
| 2006/0277823 A1 * | 12/2006 | Barnett et al. | | 47/33 |

* cited by examiner

ARTIFICIAL SURFACE DIVIDER

CROSS REFERENCE TO RELATED APPLICATIONS

The present application is a continuation of U.S. patent application Ser. No. 13/359,866, entitled, "ARTIFICIAL SURFACE DIVIDER," filed Jan. 27, 2012, which claims the benefit of U.S. Provisional Patent Application Ser. No. 61/437,178, entitled, "TURF DIVIDER," filed Jan. 28, 2011, the disclosures of which are hereby incorporated by reference.

RELATED ART

1. Field of the Invention

The present invention is directed to an artificial surface divider that may be used with artificial surface installation.

2. Brief Discussion of Related Art

Artificial turf, commonly referred to as "synthetic grass," is a viable alternative to natural sod and other ground covers due to its realistic appearance and its water conservation attributes, particularly for drought afflicted regions.

For artificial turf to be installed properly, it requires a hard edge or border for the turf material to butt against. If the artificial turf is installed without a hard edge or border, the installation is subject to weakening over time because the ends of the turf material are exposed. This exposure of the artificial turf ends commonly results in the turf pulling up and unraveling. Moreover, the base material under the artificial turf has a greater propensity to erode as water and wind can get under the exposed edge of the artificial turf.

Currently, installers of artificial turf are using simple landscape and garden edging devices, such as flexible bender boards and paver restraints, in an attempt to create a firm edge. Some of these devices, while operative to temporarily create a firm edge are very time consuming and labor intensive to install. In contrast, L-shaped paver restraints are easier to install, but these L-shaped paver restraints are less aesthetically pleasing and do not provide a durable solution.

INTRODUCTION TO THE INVENTION

The present invention is directed to an artificial surface divider that may be used with artificial surface installation.

It is a first aspect of the present invention to provide an artificial surface divider comprising a floor having a plurality of pads spaced apart from one another, the plurality of pads being mounted to a longitudinal housing having an overhang at least partially defining a longitudinal channel and a longitudinal gap that is open to the longitudinal channel, the longitudinal gap extending between an edge of the overhang and a floor of the longitudinal housing, wherein a longitudinal dimension of the artificial surface divider is the dominant dimension.

In a more detailed embodiment of the first aspect, at least one of the plurality of pads comprises a frustopyramidal pad integrally formed with the longitudinal housing. In yet another more detailed embodiment, at least one of the plurality of pads comprises a triangular pad integrally formed with the longitudinal housing. In a further detailed embodiment, the longitudinal housing includes a longitudinal floor, a longitudinal rear wall, a longitudinal roof, and a longitudinal front wall, and the longitudinal front wall is spaced apart from the longitudinal floor to provide the longitudinal gap. In still a further detailed embodiment, the longitudinal floor is perpendicular with respect to the longitudinal rear wall, and the longitudinal front wall is perpendicular with respect to the longitudinal floor. In a more detailed embodiment, the longitudinal channel spans a first vertical length, the longitudinal gap spans a second vertical length, and the first vertical length is greater than the second vertical length. In a more detailed embodiment, the longitudinal housing includes a flange extending away from the overhang.

It is a second aspect of the present invention to provide an artificial surface divider comprising: (a) a base having a floor; (b) an upstanding wall mounted to the base; (c) an eave mounted to the upstanding wall and elevated vertically above the base, where the base, upstanding wall, and the eave cooperate to define a channel that is not entirely enclosed along a longitudinal length thereof, where a longitudinal gap exists between the eave and the floor, where the base extends perpendicularly beyond the eave, and where a vertical height of the gap is less than a vertical height of the longitudinal channel.

In a more detailed embodiment of the second aspect, the floor includes a plurality of pads longitudinally spaced apart from one another. In yet another more detailed embodiment, the base, the vertical wall, and the eave defining the channel have a vertical cross-section comprising a discontinuous rectangular shape. In a further detailed embodiment, the eave includes a lip nearest to the floor, a gap spacing comprises the shortest distance between the lip and the floor, and the channel comprises a vertical height greater than the gap spacing. In still a further detailed embodiment, the embodiment further includes a descending wall extending in a direction away from the upstanding wall. In a more detailed embodiment, the upstanding wall is perpendicular with respect to the base, and the descending wall is perpendicular with respect to the base. In a more detailed embodiment, the base includes a plurality of pads extending away from the channel, the plurality of pads comprising at least one of a triangular cross-section and a frustopyramidal cross-section. In another more detailed embodiment, the floor is substantially planar, the upstanding wall comprises a vertical wall perpendicularly oriented with respect to at least a portion of the base, and the overhang comprises an L-shaped section having a first wall perpendicularly mounted to a second wall.

It is a third aspect of the present invention to provide an artificial surface divider comprising: (a) a base having a substantially planar floor with a dominant, longitudinal dimension; and, (b) an overhang with a dominant longitudinal dimension that is operatively coupled to the base, the overhang cooperating with the floor to define a recessed cavity extending longitudinally and accessible via a gap extending longitudinally between the overhang and the floor, wherein a vertical height of the gap is less than a vertical height of the cavity.

It is a fourth aspect of the present invention to provide an artificial surface divider comprising a horizontal floor extending longitudinally and laterally, the horizontal floor including at least one opening adapted to receive an artificial surface retainer, the horizontal floor coupled to an upright flange extending longitudinally and vertically away from the horizontal floor, the upright flange being coupled to an overhang extending longitudinally, vertically, and laterally so that an edge of the overhang nearest the horizontal floor is vertically spaced apart from the horizontal floor to provide a vertical gap therebetween and laterally spaced apart from the upright flange, where at least a portion of the horizontal floor, at least a portion of the upright flange, and at least a portion of the overhang cooperate to define a longitudinal cavity.

It is a fifth aspect of the present invention to provide a method of manufacturing an artificial surface divider, the method comprising: (a) extruding a material through a die having an orifice with a cross-section comprising: (i) a horizontal opening, (ii) an upright opening connected to the horizontal opening and extending vertically away from the horizontal opening, (iii) an overhang opening connected to the upright opening and extending horizontally away from the upright opening, the overhang opening extending toward the horizontal opening; (b) cooling the material after the material exits the die to solidify the material; and, (c) cutting the solidified material into segments having a predefined length.

In a more detailed embodiment of the fifth aspect, the upright opening extends vertically above and below the horizontal opening. In yet another more detailed embodiment, the upright opening extends vertically above the horizontal opening and does not extend vertically below the horizontal opening. In a further detailed embodiment, the upright opening is perpendicular with respect to the horizontal opening. In still a further detailed embodiment, cooling the material after it exits the die to solidify the material results in: (A) a horizontal floor extending longitudinally and laterally; (B) an upright flange connected to the horizontal floor, the upright flange extending vertically and longitudinally; (C) an overhang connected to the upright flange, the overhang extending longitudinally, laterally and vertically; (D) a gap extending longitudinally and vertically between at least a portion of the horizontal floor and at least a portion of the overhang; and, (E) a longitudinal cavity cooperatively defined by the horizontal floor, the upright flange, and the overhang. In a more detailed embodiment, the method further includes the step of repetitively removing segments of the horizontal floor to create a plurality of cut-outs, where each of the cut-outs has the same shape and is equidistantly spaced apart in a repeating fashion from adjacent cut-outs.

DETAILED DESCRIPTION

Figure 1:
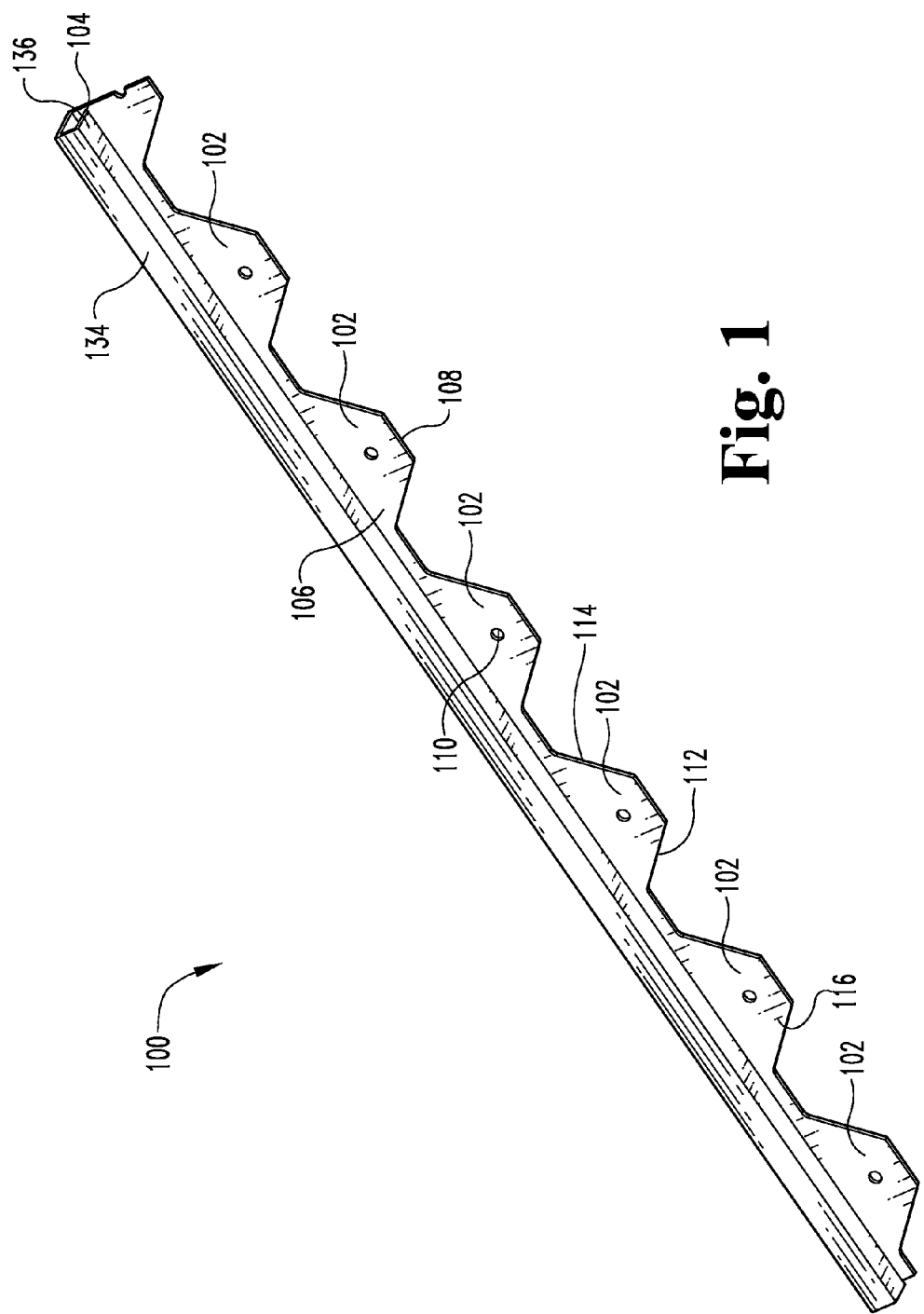
FIG. 1 is an elevated perspective view of a first exemplary artificial surface divider in accordance with the instant disclosure
Figure 2:
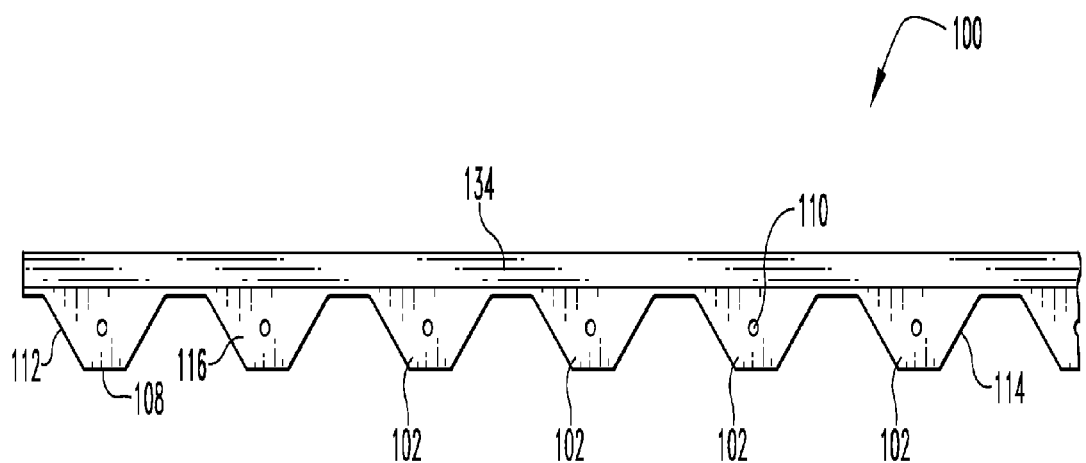
FIG. 2 is a top view of the exemplary artificial surface divider of FIG. 1.
Figure 3:
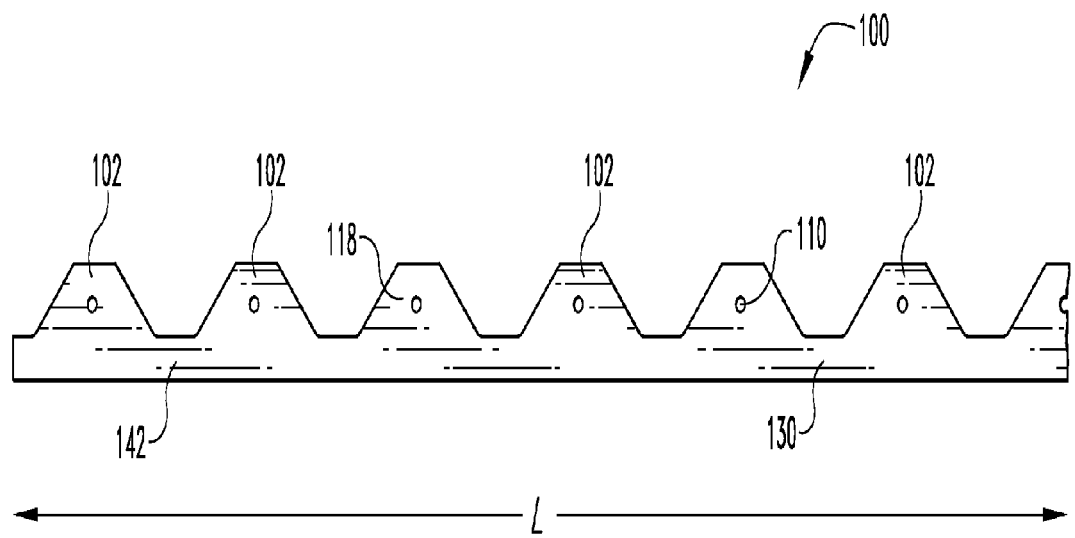
FIG. 3 is a bottom view of the exemplary artificial surface divider of FIG. 1.
Figure 4:
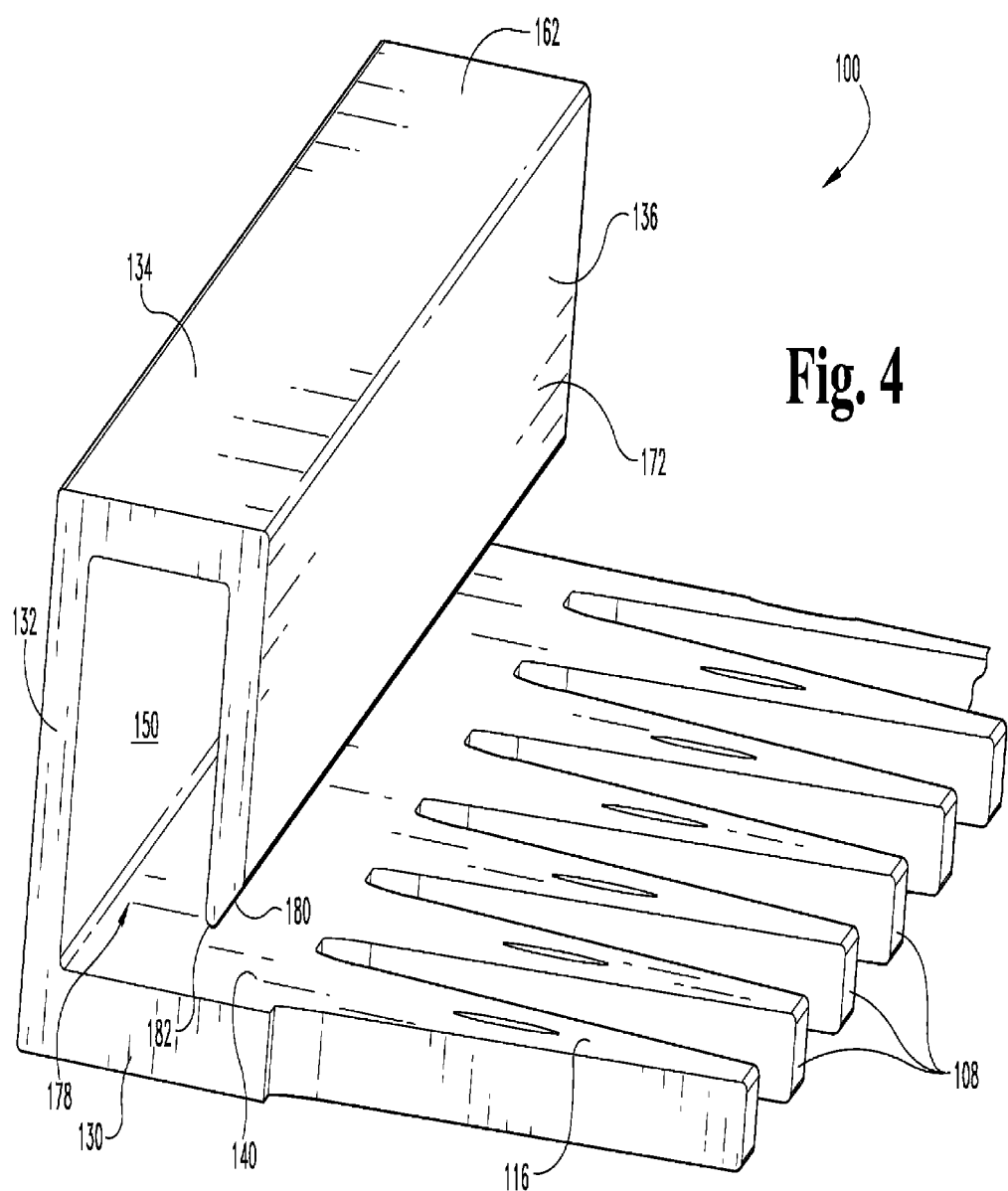
FIG. 4 is an elevated perspective view of an end of the exemplary artificial surface divider of FIG. 1.

The exemplary embodiments of the present disclosure are described and illustrated below to encompass artificial surface dividers and methods of manufacturing artificial surface dividers. Of course, it will be apparent to those of ordinary skill in the art that the embodiments discussed below are exemplary in nature and may be reconfigured without departing from the scope and spirit of the present disclosure. However, for clarity and precision, the exemplary embodiments as discussed below may include optional steps, methods, and features that one of ordinary skill should recognize as not being a requisite to fall within the scope of the present disclosure.

Referencing FIGS. 1-6, an exemplary artificial surface divider 100 comprises a plurality of ground pads 102 that extend outward from a common rail 104. Each ground pad 102 has a frustopyramidal shape with a wide base 106 that connects to the rail 104. The base 106 tapers as it extends outward from the rail 104 until reaching a flat end 108. Interposing the flat end 108 and the base 106 is an orifice 110 that is generally centered between the flat end and the base, as well as being centered between a medial side 112 and a lateral side 114 of the pad 102. As will be discussed in greater detail hereafter, the orifice is adapted to receive a ground spike or other retainer in order to mount the artificial surface divider 100 to an underlying base material such as dirt or packed clay. Each pad 102 includes a top surface 116 and an opposed bottom surface 118 that are substantially planar. In this exemplary embodiment, the bottom surface 118 is adapted to contact the underlying base material, while the top surface 116 is adapted to contact the underside of a section of artificial turf.

The rail 104 comprises four rail segments 130, 132, 134, 136 that are mounted to one another. The first rail segment 130 is mounted to each of the ground pads 102 and extends laterally away from the grounds pads in an opposite direction. The first rail segment 130 includes a top planar surface 140 and an opposed bottom planar surface 142 that extend longitudinally to define a lengthwise dimension L of the artificial surface divider 100. In this exemplary embodiment, the first rail segment 130 is seamlessly mounted to each of the ground pads 102 so that the top surfaces 116 of the ground pads are co-planar with the top surface 140, while the bottom surfaces 118 of the ground pads are co-planar with the bottom surface 142. In this manner, the thickness of the ground pads 102 is generally the same as that of the first rail segment 130, though it does not need to be.

The second rail segment 132 is mounted to the first rail segment 130 along corresponding edges so that the segments 130, 132 are perpendicular. The second rail segment 132 includes opposed top and bottom surfaces 150, 152 that extend longitudinally along its length. Accordingly, the top surfaces 140, 150 of the first and second rail segments 130, 132 are perpendicular with respect to one another. So too are the bottom surfaces 152, 142 perpendicular with respect to one another. In this manner, the segments 130, 132 provide an L-shaped vertical cross-section. But this L-shaped cross-section does not account for the third rail segment 134.

The third rail segment 134 is mounted to the second rail segment 132 along corresponding edges so that the segments 132, 134 are perpendicular. The third rail segment 134 includes opposed top and bottom surfaces 160, 162 that extend longitudinally along its length. Accordingly, the top surfaces 150, 160 of the second and third rail segments 132, 134 are perpendicular with respect to one another, while the top surfaces 140, 160 of the first and third segments face one another. Likewise, the bottom surfaces 152, 162 of the second and third segments 132, 134 are perpendicular with respect to one another, while the bottom surfaces 142, 162 of the first and third segments 130, 134 face away (i.e., opposite) one another. In this manner, the segments 130, 132, 134 provide block C-shaped vertical cross-section. But this block C-shaped cross-section does not account for the fourth rail segment 136.

The fourth rail segment 136 is mounted to the third rail segment 136 along corresponding edges so that the segments 134, 136 are perpendicular. In this exemplary embodiment, the fourth rail segment 136 does not extend to contact the top surface 140 of the first rail segment 130. Instead, an edge 180 of the fourth rail segment 136 stops short of the bottom surface 142 of the first rail segment 130, thereby creating a longitudinal gap. The fourth rail segment 136 also includes opposed top and bottom surfaces 170, 172 that extend longitudinally along its length. Accordingly, the top surfaces 160, 170 of the third and fourth rail segments 134, 136 are perpendicular with respect to one another, while the top surfaces 150, 170 of the second and fourth segments 132, 136 face one another. In addition, the top surfaces 140, 170 of the first and fourth rail segments 132, 136 are perpendicular with respect to one another. Similarly, the bottom surfaces 162, 172 of the third and fourth segments 134, 136 are perpendicular with respect to one another, while the bottom surfaces 152, 172 of the second and fourth segments 132, 136 face away (i.e., opposite) one another. And the bottom surfaces 142, 172 of the first and fourth segments 130, 136 are perpendicular with respect to one another. In this manner, the segments 130, 132, 134, 136 provide a near-rectangular vertical cross-section delineating a near-rectangular longitudinal cavity 178.

The discontinuity in the near-rectangular cross-section occurs as a result of the edge 180 not reaching the top surface 140 of the first rail segment 130. In this exemplary embodiment, the edge 180 is tapered from the bottom surface 172 to the top surface 170 to form a point 182 along the edge adjacent the top surface. The spacing between the point 182 and the top surface 140 of the first rail segment 130 allows for insertion of the edge of an artificial turf section into the longitudinal cavity 178.

The instant artificial surface divider 100 may be manufacturing in a number of ways. In exemplary form the artificial surface divider 100 comprises an extruded thermoplastic section cut to a predetermined length. This section is the result of extruding a thermoplastic through a die having the vertical cross-section shown in FIG. 5. After the section has been extruded, a punch press may be used to remove material to form the cavities 184 in between respective ground pads 102, and optionally simultaneously punching the through orifice 110 in each ground pad.

Figure 7:
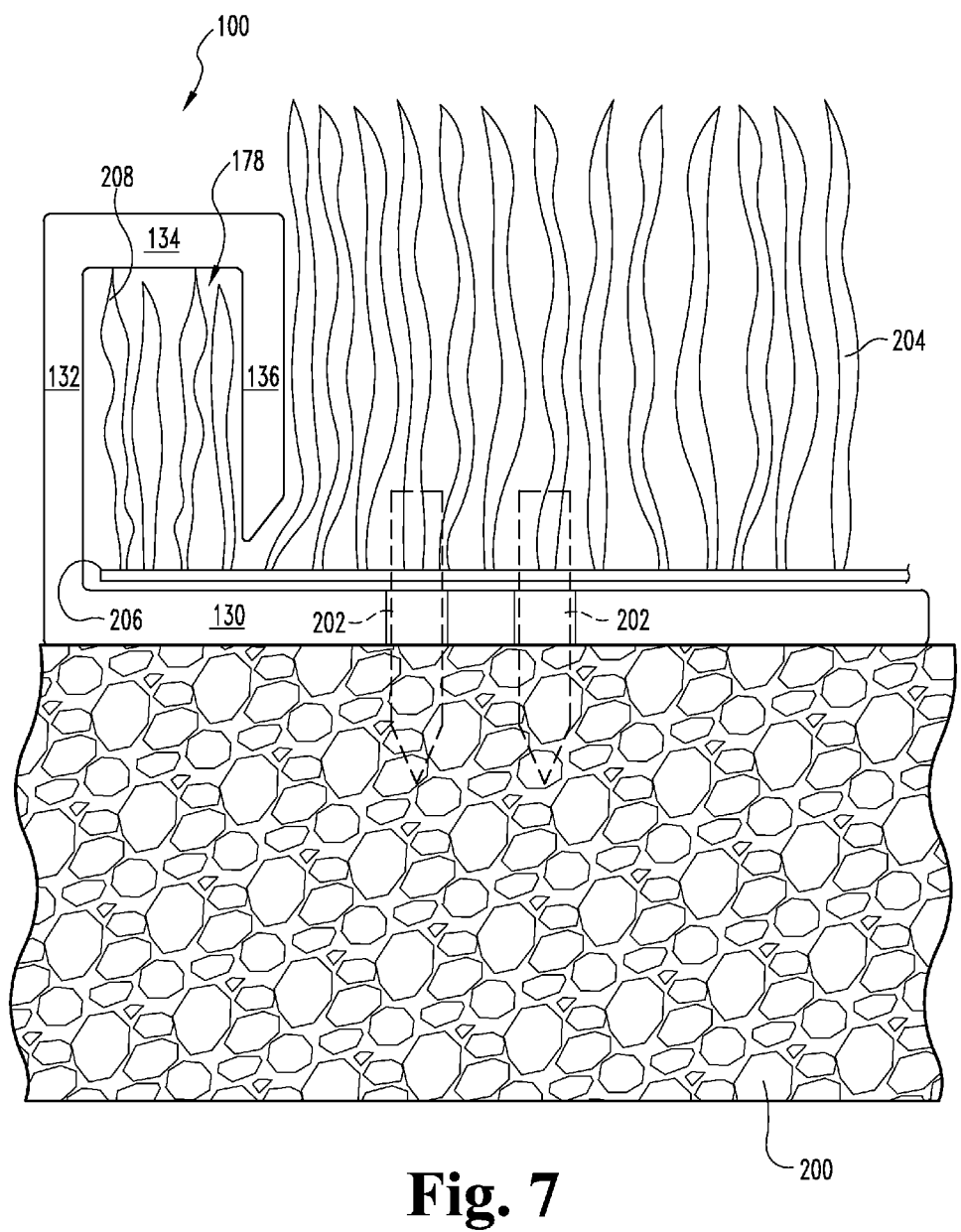
FIG. 7 is a side view showing the exemplary artificial surface divider of FIG. 1 when installed as part of an artificial turf installation.
Figure 8:
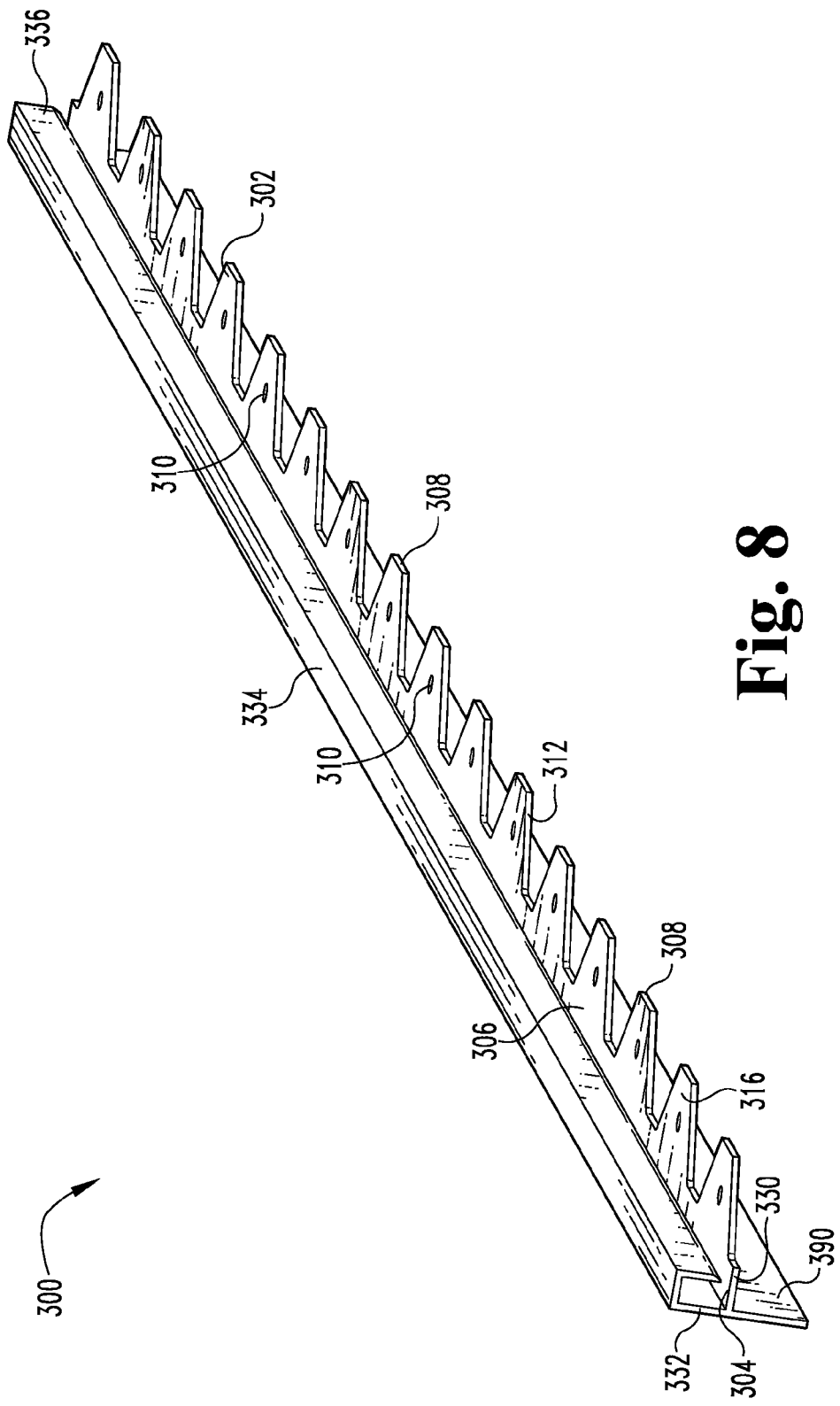
FIG. 8 is an elevated perspective view of a second exemplary artificial surface divider in accordance with the instant disclosure
Figure 9:
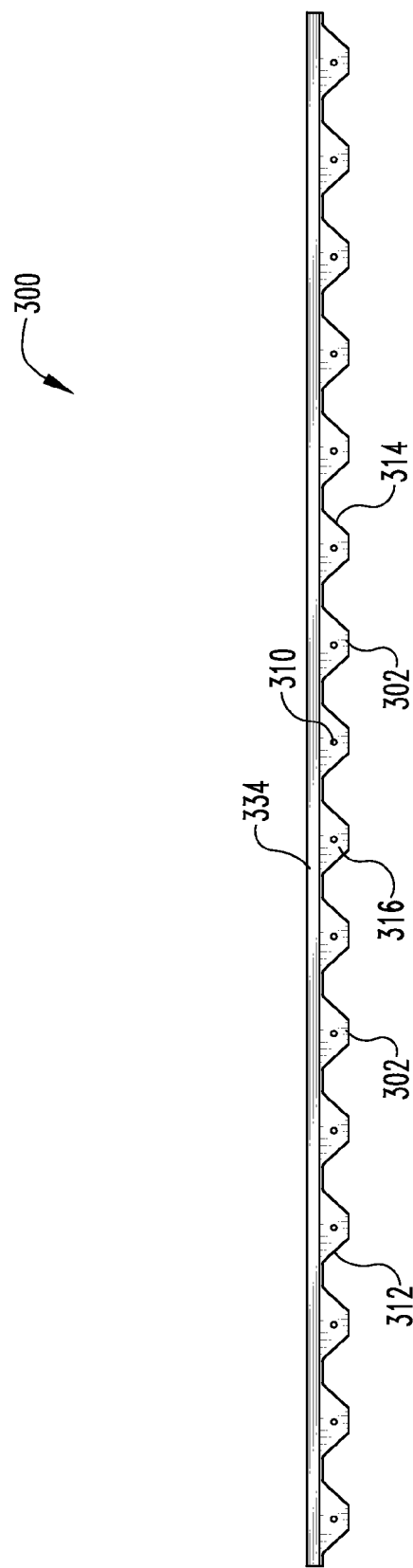
FIG. 9 is a top view of the exemplary artificial surface divider of FIG. 8.

Referring to FIG. 7, installation of the instant artificial surface divider 100 includes compacting an aggregate sub-base 200. After the aggregate sub-base 20.0 has been compacted, the artificial surface divider 100 is fastened to the sub-base 200 using heavy-duty metal nails or spikes 202 that extend through the orifices 110. The position of the artificial surface divider 100 signifies the end of the artificial turf 204, which is cut to size and hidden behind the fourth rail segment 136. In order to fit the end 206 of the artificial turf 204 into the longitudinal cavity 178, a predetermined length of artificial turf blades 208 are trimmed. It should be noted, however, that the end blades 208 need not be trimmed, particularly if the height of these blades is less than the height of the longitudinal cavity 178. The artificial turf 204 is subsequently nailed to the artificial surface divider 100 and the sub-base 200 using more nails or spikes 202.

Exemplary dimension for the instant artificial surface divider 100 include a ⅜ inch diameter for the through orifice i10. The ground pad 102 base is 4.5 inches long, whereas the flat end is 1.5 inches long. Each medial and lateral side 112, 114 of the ground pad is 2.3 inches long. The distance between the top and bottom surfaces 116, 118, 140, 142 of the first rail segment 130 and the ground pads 102 is 3/16 inch. The distance between the top and bottom surfaces 150, 152, 160, 162, 170, 172 of the second, third, and fourth rail segments 132, 134, 136 is ⅛ inch. The distance between the top surfaces 140, 160 of the first and third rail segments 130, 134 is ⅞ inch. The distance between the top surfaces 150, 170 of the second and fourth rail segments 132, 136 is ½ inch. And an exemplary distance from the point 182 to the top surface 140 of the first rail segment 130 is ⅛ inch.

Referencing FIGS. 8-12, an exemplary artificial surface divider 300 comprises a plurality of ground pads 302 that extend outward from a common rail 304. Each ground pad 302 has a frustopyramidal shape with a wide base 306 that connects to the rail 304. The base 306 tapers as it extends outward from the rail 304 until reaching a flat end 308. Interposing the flat end 308 and the base 306 is an orifice 310 that is generally centered between the flat end and the base, as well as being centered between a medial side 312 and a lateral side 314 of the pad 302. As will be discussed in greater detail hereafter, the orifice is adapted to receive a ground spike or other retainer in order to mount the artificial surface divider 300 to an underlying base material such as dirt or packed clay. Each pad 302 includes a top surface 316 and an opposed bottom surface 318 that are substantially planar. In this exemplary embodiment, the bottom surface 318 is adapted to contact the underlying base material, while the top surface 316 is adapted to contact the underside of a section of artificial turf.

The rail 304 comprises five rail segments 330, 332, 334, 336, 390 that are mounted to one another. The first rail segment 330, also known as a floor, is mounted to each of the ground pads 302 and extends laterally away from the grounds pads in an opposite direction. The first rail segment 330 includes a top planar surface 340 and an opposed bottom planar surface 342 that extend longitudinally to define a lengthwise dimension L of the artificial surface divider 300. In this exemplary embodiment, the first rail segment 330 is seamlessly mounted to each of the ground pads 302 so that the top surfaces 316 of the ground pads are co-planar with the top surface 340 of the first rail segment, while the bottom surfaces 318 of the ground pads are co-planar with the bottom surface 342 of the first rail segment. In this manner, the thickness of the ground pads 302 is generally the same as that of the first rail segment 330, though it does not need to be.

The second rail segment 332 is mounted perpendicularly to the first rail segment 330 along corresponding edges. The second rail segment 332 includes opposed top and bottom surfaces 350, 352 that extend longitudinally along its length. Accordingly, the top surfaces 340, 350 of the first and second rail segments 330, 332 are perpendicular with respect to one another. So too are the bottom surfaces 352, 342 perpendicular with respect to one another. In this manner, the segments 330, 332 provide an L-shaped vertical cross-section. But this L-shaped cross-section does not account for the third rail segment 334.

The third rail segment 334 is mounted perpendicularly to the second rail segment 332 along corresponding edges. The third rail segment 334 includes opposed top and bottom surfaces 360, 362 that extend longitudinally along its length. Accordingly, the top surfaces 350, 360 of the second and third rail segments 332, 334 are perpendicular with respect to one another; while the top surfaces 340, 360 of the first and third segments face one another. Likewise, the bottom surfaces 352, 362 of the second and third segments 332, 334 are perpendicular with respect to one another, while the bottom surfaces 342, 362 of the first and third segments 330, 334 face away (i.e., opposite) one another. In this manner, the segments 330, 332, 334 provide block C-shaped vertical cross-section. But this block C-shaped cross-section does not account for the fourth rail segment 336.

The fourth rail segment 336 is mounted perpendicularly to the third rail segment 336 along corresponding edges. In this exemplary embodiment, the fourth rail segment 336 does not extend to contact the top surface 340 of the first rail segment 330. Instead, an edge 380 of the fourth rail segment 336 stops short of the bottom surface 342 of the first rail segment 330, thereby creating a longitudinal gap. The fourth rail segment 336 also includes opposed top and bottom surfaces 370, 372 that extend longitudinally along its length. Accordingly, the top surfaces 360, 370 of the third and fourth rail segments 334, 336 are perpendicular with respect to one another, while the top surfaces 350, 370 of the second and fourth segments 332, 336 face one another. In addition, the top surfaces 340, 370 of the first and fourth rail segments 332, 336 are perpendicular with respect to one another. Similarly, the bottom surfaces 362, 372 of the third and fourth segments 334, 336 are perpendicular with respect to one another, while the bottom surfaces 352, 372 of the second and fourth segments 332, 336 face away (i.e., opposite) one another. And the bottom surfaces 342, 372 of the first and fourth segments 330, 336 are perpendicular with respect to one another. In this manner, the segments 330, 332, 334, 336 provide a near-rectangular vertical cross-section delineating a near-rectangular longitudinal cavity 378.

The discontinuity in the near-rectangular cross-section occurs as a result of the edge 380 not reaching the top surface 340 of the first rail segment 330. In this exemplary embodiment, the edge 380 is tapered from the bottom surface 372 to the top surface 370 to form a point 382 along the edge adjacent the top surface. The spacing between the point 382 and the top surface 340 of the first rail segment 330 allows for insertion of the edge of an artificial turf section into the longitudinal cavity 378.

The fifth rail segment 390 is mounted perpendicularly to the first rail segment 330 along corresponding edges. The fifth rail segment 390 includes opposed top and bottom surfaces 392, 394 that extend longitudinally along its length. At the same time, an exposed edge 396 of the fifth rail segment 390, which is opposite the second rail segment 332, may be tapered or rounded to facilitate easier insertion of the artificial surface divider 300 into a sub-base or ground location. Accordingly, the top surfaces 340, 392 of the first and fifth rail segments 330, 390 are perpendicular with respect to one another. So too are the bottom surfaces 342, 394 perpendicular with respect to one another. Conversely, the fifth rail segment 390 is mounted coaxially to the second rail segment 332 along corresponding edges. In this manner, the top surfaces 350, 392 of the second and fifth rail segments 332, 390 are coaxial and co-planar with respect to one another. So too are the bottom surfaces 352, 394 coaxial and co-planar with respect to one another. In this manner, the first, second, and fifth segments 330, 332, 390 provide a T-shaped vertical cross-section. But this T-shaped cross-section does not account for the third and fourth rail segments 334, 336.

The instant artificial surface divider 300 may be manufacturing in a number of ways. In exemplary form the artificial surface divider 300 comprises an extruded thermoplastic section cut to a predetermined length. This section is the result of extruding a thermoplastic through a die having the vertical cross-section shown in FIG. 10. After the section has been extruded, a punch press may be used to remove material to form the cavities 384 in between respective ground pads 302, and optionally simultaneously punching the through orifice 310 in each ground pad.

Figure 13:
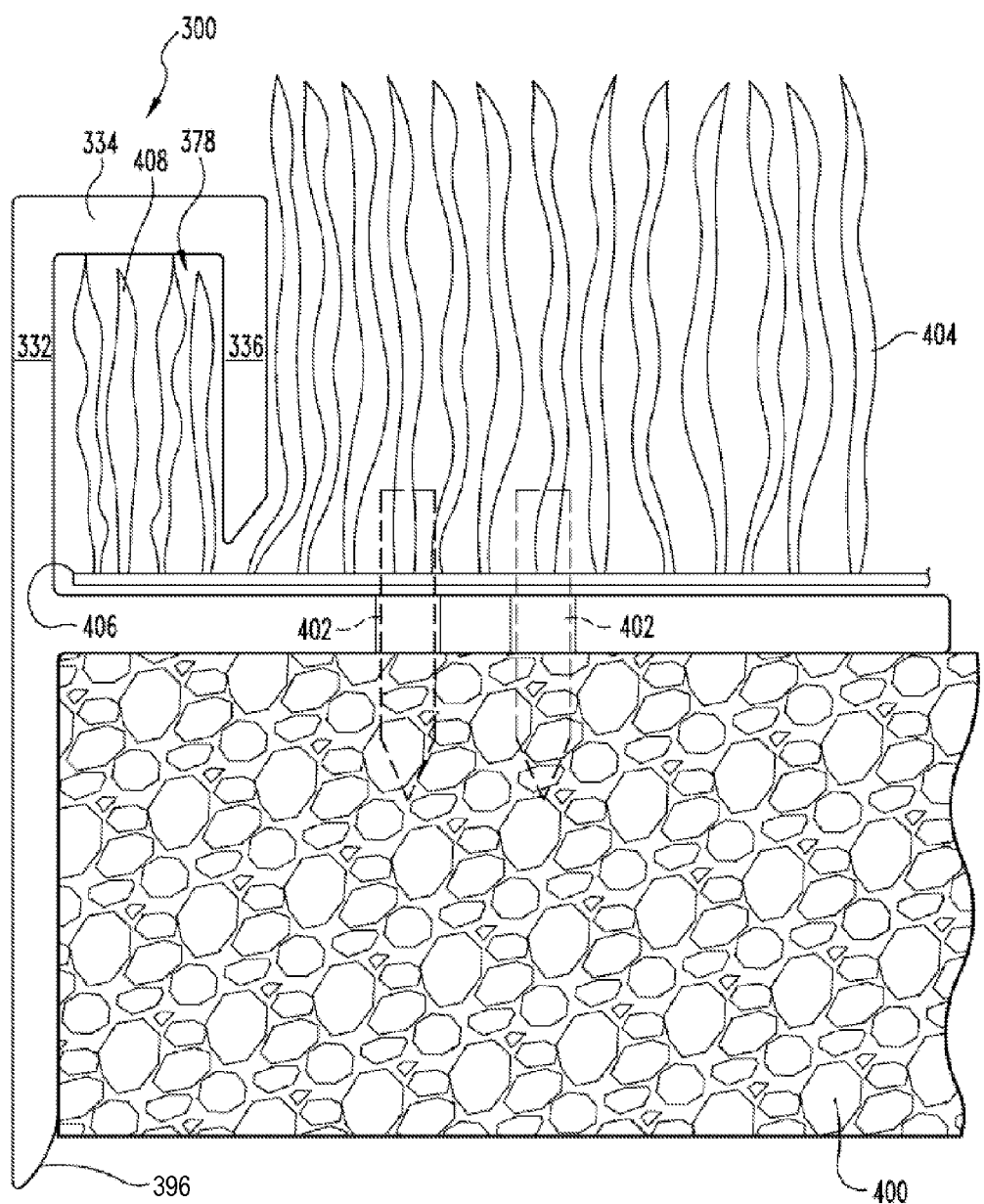
FIG. 13 is a side view showing the exemplary artificial surface divider of FIG. 1 when installed as part of an artificial turf installation.

Referring to FIG. 13, installation of the instant artificial surface divider 300 may include compacting an aggregate sub-base 400 or other ground material. After the aggregate sub-base 400 has been compacted or whatever other ground preparation is carried out, the artificial surface divider 300 is inserted into the ground (in exemplary form, the sub-base 400) so that the exposed edge 396 of the fifth rail segment 390 is inserted initially into the ground while the fifth rail segment is oriented vertically. Continued movement of the fifth rail segment 390 vertically downward eventually results in the surface of the ground 400 coming in contact with the bottom planar surface 342 of the first rail segment 330 and bottom surfaces 318 of the ground pads 302. Thereafter, heavy-duty metal nails, spikes or some other fastener 402 may extend through the orifices 310 of the ground pads 302 in order to secure the artificial surface divider 300 to the ground 400.

Presuming the artificial surface divider 300 is used with artificial turf/grass 404, the installed position of the artificial surface divider signifies the end or boundary of the artificial turf. In other words, the artificial turf 404 is cut to the appropriate size and at least one of its edges 406 is inserted through the gap between the first and fourth segments 330, 336 and into the longitudinal cavity 378 to hide this edge. In exemplary form, in order to fit the edge 406 of the artificial turf 404 into the longitudinal cavity 378, a predetermined length of artificial turf blades 408 may be trimmed. It should be noted, however, that the end blades 408 need not be trimmed, particularly if the height of these blades is less than the height of the longitudinal cavity 378. The edge 406 of the artificial turf 404 is inserted through the gap and positioned to abut or closely approximate the top surface 350 of the second rail segment 332 in order for the edge to be housed within the longitudinal cavity 378. Thereafter, the artificial turf 404 is fastened to the artificial surface divider 300 and the sub-base 400 using more nails, spikes or other fasteners 402.

Exemplary dimension for the instant artificial surface divider 300 include a ⅜ inch diameter for the through orifice 310. The ground pad 302 base is 4.5 inches long, whereas the flat end is 1.5 inches long. Each medial and lateral side 312, 314 of the ground pad is 2.3 inches long. The distance between the top and bottom surfaces 316, 318, 340, 342 of the first rail segment 330 and the ground pads 302 is 3/16 inch. The distance between the top and bottom surfaces 350, 352, 360, 362, 370, 372 of the second, third, and fourth rail segments 332, 334, 336 is ⅛ inch. The distance between the top surfaces 340, 360 of the first and third rail segments 330, 334 is ⅞ inch. The distance between the top surfaces 350, 370 of the second and fourth rail segments 332, 336 is ½ inch. And an exemplary distance or gap from the point 382 to the top surface 340 of the first rail segment 330 is ⅛ inch. The vertical length of the fifth rail is three inches. But it should be understood that these dimensions are only representative of an example, not of the entire invention.

Figure 5:
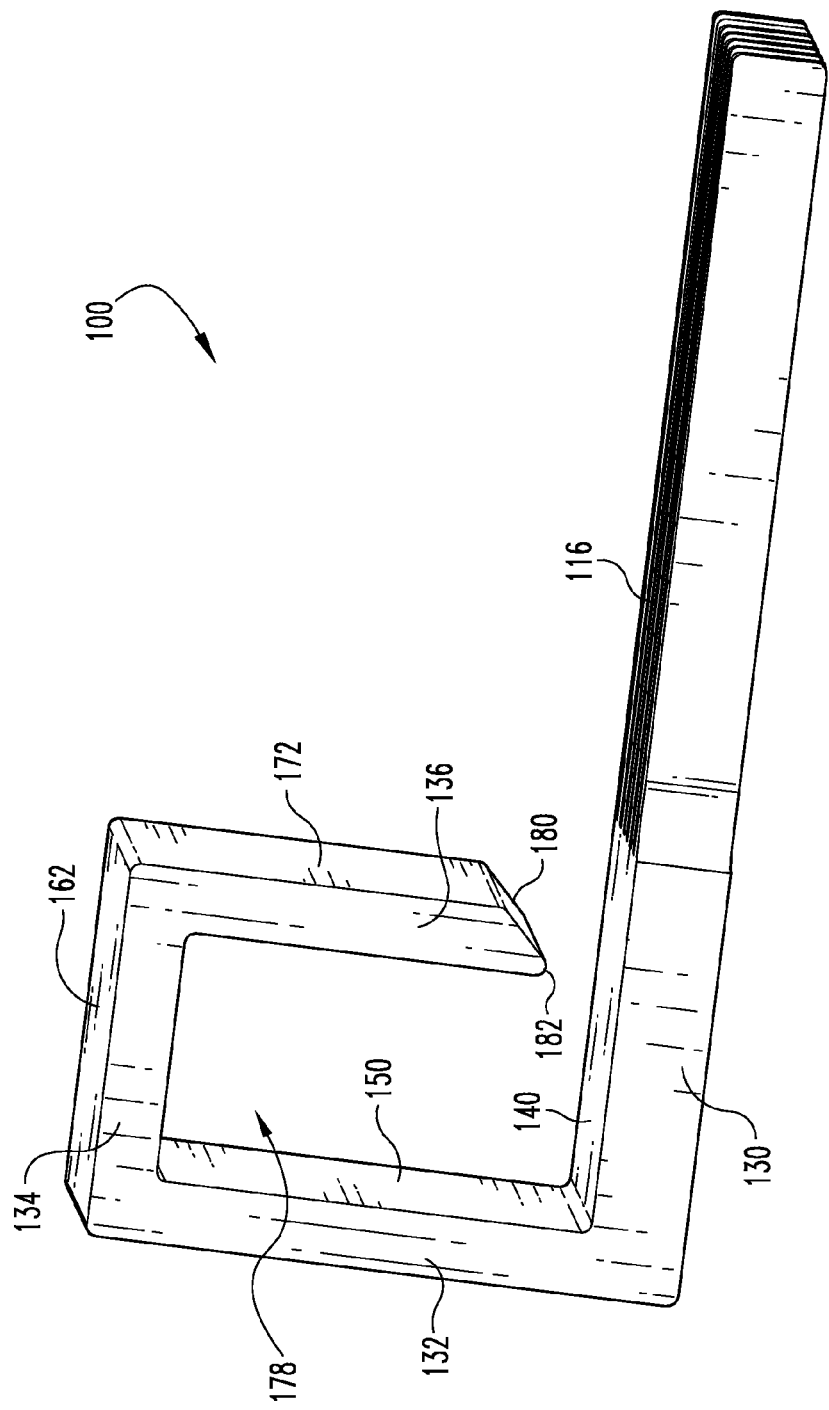
FIG. 5 is a side view of the exemplary artificial surface divider of FIG. 1.
Figure 6:
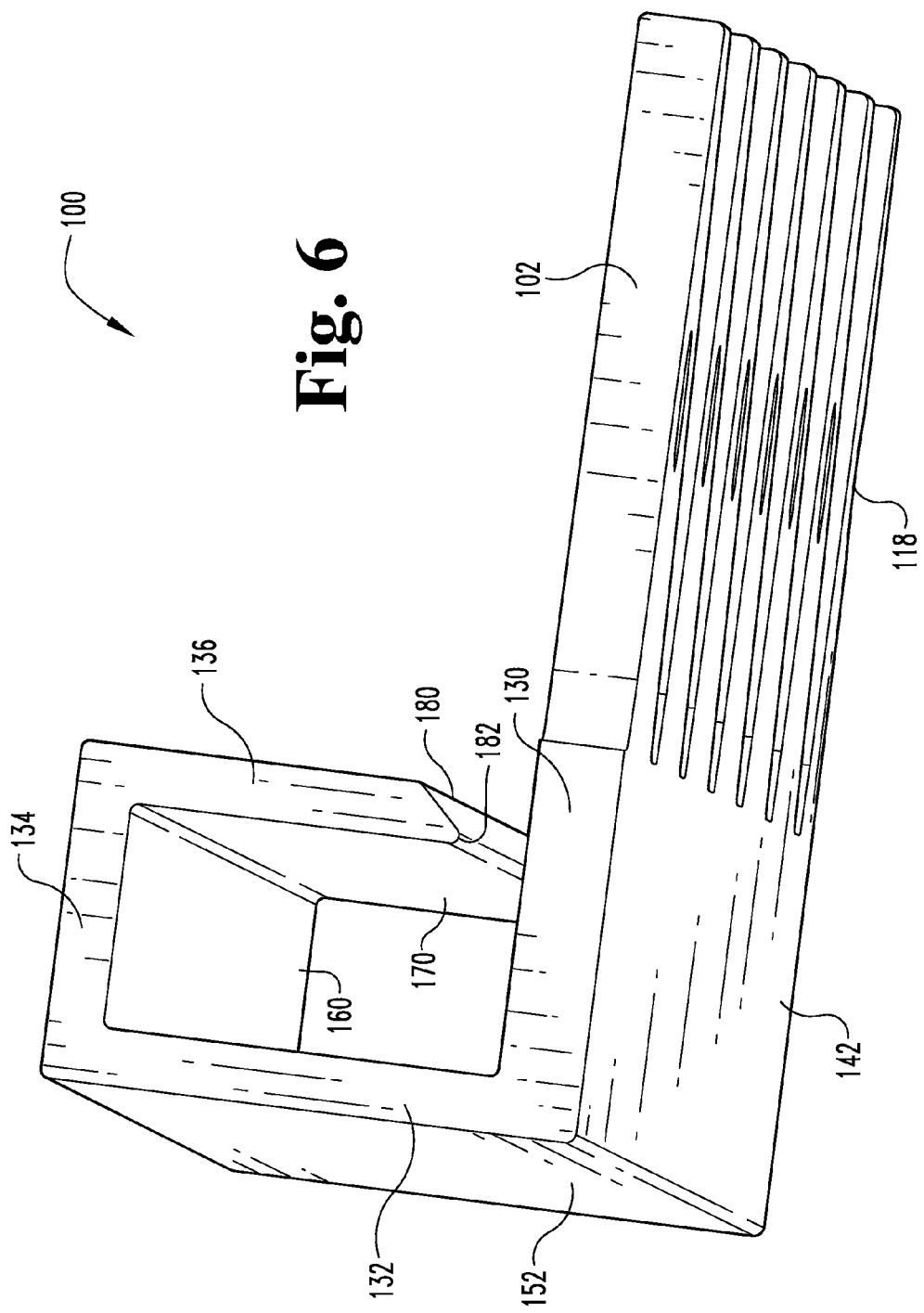
FIG. 6 is an underneath perspective view from the end of the exemplary artificial surface divider of FIG. 1.
Figure 10:
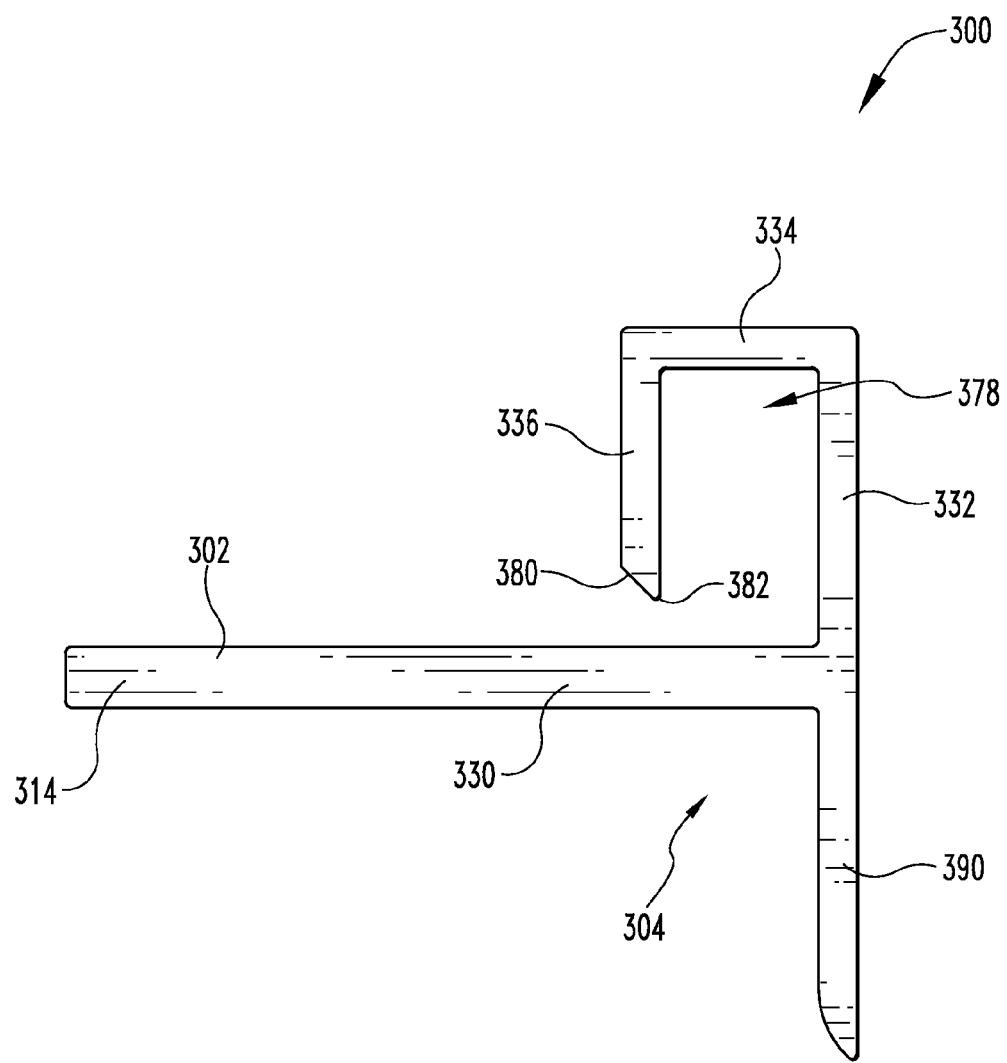
FIG. 10 is a side view of the exemplary artificial surface divider of FIG. 8.
Figure 11:
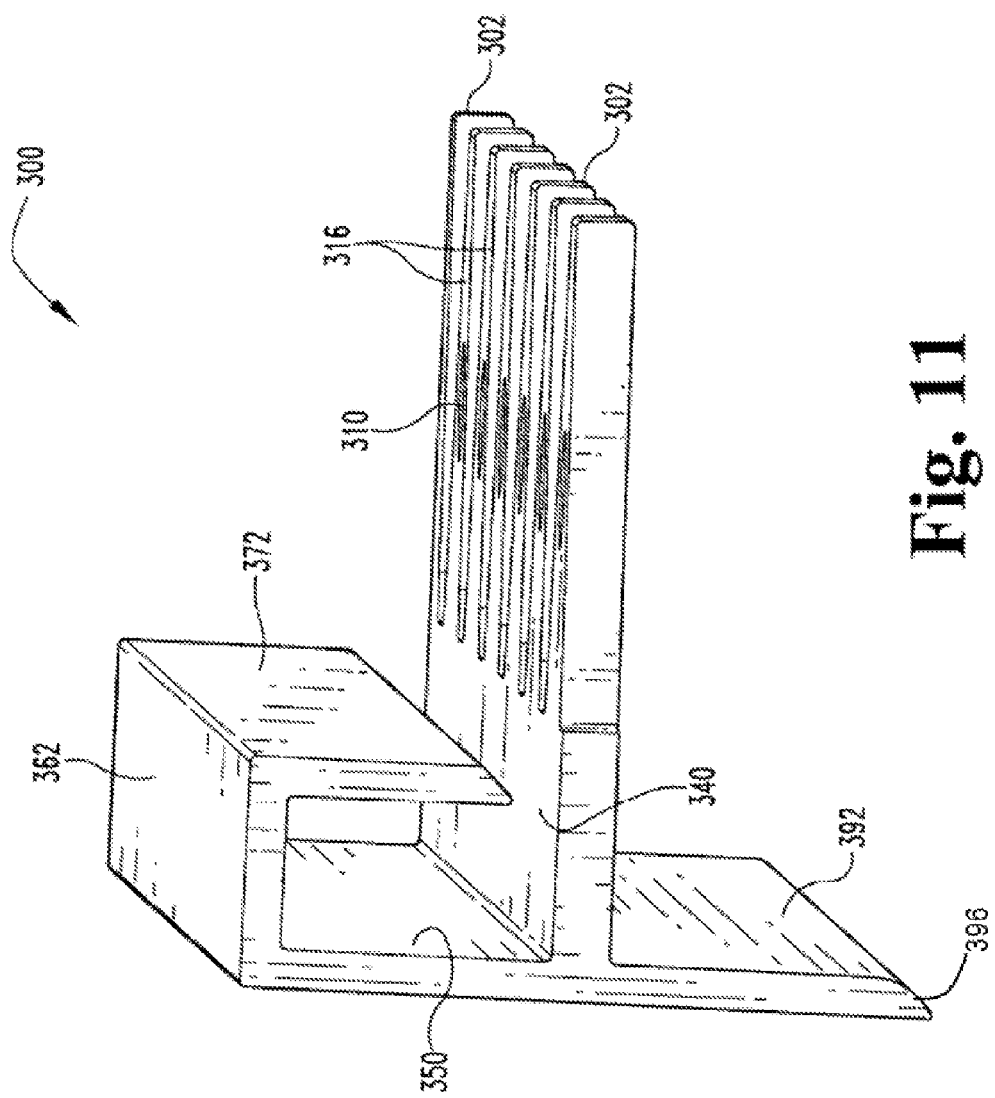
FIG. 11 is an elevated perspective view of an end of the exemplary artificial surface divider of FIG. 8.
Figure 12:
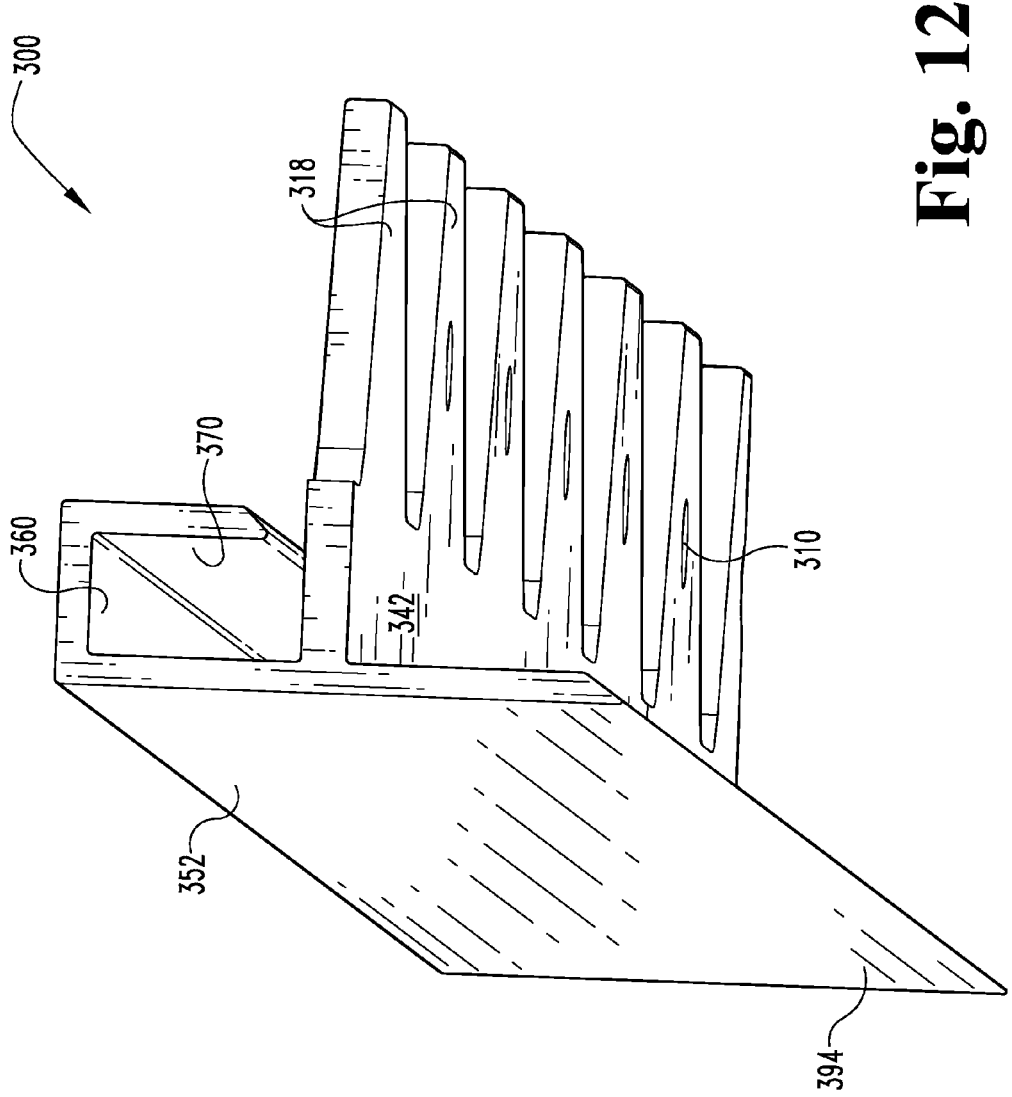
FIG. 12 is an underneath perspective view from the end of the exemplary artificial surface divider of FIG. 1.

Fabrication of either artificial surface divider 100, 300 may take many forms and steps. But, for purposed of exemplary explanation only, a method of fabricating either or both artificial surface dividers 100, 300 will now be discussed. In exemplary form, a die (not shown) is created to embody the cross-section in either FIG. 5 or FIG. 10. This die is then injected with molten material, such as molten thermoplastic material, which is extruded to draw out a longitudinal shape having a uniform cross-section as shown in FIG. 5 or FIG. 10. After the molten material exits the die, it remains temporarily in a viscous state that may be further deformed. In order to preserve the shape imparted by the die, liquid water is sprayed on the material exiting the die to solidify the material and create longitudinal lengths having the prescribed cross-section. Thereafter, the solidified material is cut into predefined longitudinal lengths, such as ten and eight foot sections, and readied for further processing.

In particular, when the solidified material exits the die, the ground pads 102, 302 are not yet completed. Rather, the solidified material includes a continuous flange that needs to be shaped (cut out in this case) in order to form the ground pads 102, 302. In exemplary form, after the material is cut into predetermined lengths, each predetermined length is fed into a cutting press (not shown) in order to make several cuts at once and remove the requisite material to delineate the frustopyramidal or triangular (other shapes for the ground pads may be created) ground pads 102, 302. At the same time, the cutting press may also form the openings 110, 310 through the ground pads that are adapted to receive fasteners such as lawn nails or garden spikes.

Following from the above description and invention summaries, it should be apparent to those of ordinary skill in the art that, while the methods and apparatuses herein described constitute exemplary embodiments of the present invention, it is to be understood that the inventions contained herein are not limited to the above precise embodiment and that changes may be made without departing from the scope of the invention as defined by the following proposed points of novelty. Likewise, it is to be understood that it is not necessary to meet any or all of the identified advantages or objects of the invention disclosed herein in order to fall within the scope of the invention, since inherent and/or unforeseen advantages of the present invention may exist even though they may not have been explicitly discussed herein.

I claim:

1. An artificial turf edging system for mounting artificial turf on a sub-base, the artificial turf edging system comprising:
    artificial turf having an underside, a topside and an outer edge and turf blades extending from the topside of the artificial turf;
    a divider formed of a single piece of material, the divider comprising a floor, an upstanding wall, a plurality of ground pads and an overhang;
        the floor having a top surface for contacting the underside of the artificial turf and a bottom surface for contacting the sub-base;
        the upstanding wall having a bottom end and a top end, the bottom end of the upstanding wall being connected to the top surface of the floor;
        each of the plurality of ground pads having a bottom surface contacting the sub-base and a top surface facing away from the sub-base and contacting the underside of the artificial turf, the artificial turf being fastened to the sub-base through the plurality of ground pads, the plurality of ground pads being spaced apart from one another and extending from the floor away from the upstanding wall; and
        the overhang comprising a top wall connected to the top end of the upstanding wall and extending substantially parallel to the floor and extending away from the upstanding wall in the same direction as the plurality of ground pads, the overhang further comprising a descending wall extending substantially parallel to the upstanding wall from the top wall towards the floor, the overhang having a bottom edge nearest the floor, the bottom edge of the overhang being in an overhang plane that is substantially perpendicular to the floor, the bottom edge of the overhang being elevated vertically above the floor in the overhang plane, the floor extending at least to the overhang plane;
    wherein the floor, the upstanding wall, and the overhang form a longitudinal channel with an opening along a longitudinal gap between the bottom edge of the overhang and the floor, the longitudinal gap and the plurality of ground pads being on the same side of the upstanding wall; and
    wherein the outer edge of the artificial turf extends through the longitudinal gap and is hidden in the longitudinal channel under the overhang; and the turf blades at the outer edge of the artificial turf extend from the topside of the artificial turf into the longitudinal channel.

2. The artificial turf edging system of claim 1, wherein the longitudinal channel has a vertical cross-section of a substantially discontinuous rectangular shape.

3. The artificial turf edging system of claim 1, further comprising a ground wall for inserting in the sub-base, the ground wall having a bottom end and a top end, the top end of the ground wall being connected to the bottom surface of the floor, the ground wall and the upstanding wall being in substantially the same plane.

4. The artificial turf edging system of claim 1, wherein the vertical distance in the overhang plane between the bottom edge of the overhang and the floor is less than the vertical height of the turf blades of the artificial turf to allow the outer edge of the artificial turf to extend through the longitudinal gap and to hide the outer edge of the artificial turf in the longitudinal channel under the overhang.

5. The artificial turf edging system of claim 1, wherein:
    the top wall comprises a back end and a front end, the back end of the top wall being connected to the top end of the upstanding wall, the top wall being elevated vertically above the floor; and
    the descending wall comprises a bottom end and a top end, the top end of the descending wall being connected to the front end of the top wall, the bottom end of the descending wall being the bottom edge of the overhang.

6. The artificial turf edging system of claim 1, wherein each of the plurality of ground pads has a substantially frustopyramidal shape.

7. The artificial turf edging system of claim 1, wherein the floor and the plurality of ground pads are all substantially in a base plane.

8. The artificial turf edging system of claim 7, wherein the upstanding wall is substantially perpendicular to the base plane.

9. The artificial turf edging system of claim 8, wherein:
the top wall comprises a back end and a front end, the back end of the top wall being connected to the top end of the upstanding wall, the top wall being elevated vertically above the floor; and
the descending wall comprises a top end and a bottom end, the top end of the descending wall being connected to the front end of the top wall, the longitudinal gap being formed between the bottom end of the descending wall and the floor, the bottom end of the descending wall being the bottom edge of the overhang.

10. The artificial turf edging system of claim 9, wherein the bottom edge of the descending wall forms a point.

11. The artificial turf edging system of claim 10, wherein the vertical distance between the bottom end of the descending wall and the floor is less than the vertical height of the turf blades of the artificial turf.

12. The artificial turf edging system of claim 11, wherein each of the plurality of ground pads has a substantially frustopyramidal shape.

13. The artificial turf edging system of claim 1, wherein the outer edge of the artificial turf slidably extends through the longitudinal gap.

14. The artificial turf edging system of claim 1, wherein the artificial turf is only fastened to the divider through the plurality of ground pads.

15. An artificial turf edging system for mounting artificial turf on a sub-base, the artificial turf having an underside, a topside and an outer edge and turf blades extending from the topside of the artificial turf, the artificial turf edging system comprising:
a divider formed of a single piece of material, the divider comprising a longitudinal housing and a plurality of ground pads;
the longitudinal housing having a floor and an overhang at least partially defining a longitudinal channel and a longitudinal gap that is open to the longitudinal channel, the longitudinal gap extending between a bottom edge of the overhang and the floor, the bottom edge of the overhang and the longitudinal gap being in an overhang plane that is substantially perpendicular to the floor, the floor extending at least to the overhang plane;
wherein the floor comprises a first rail segment having a top surface contacting the underside of the artificial turf, a bottom surface contacting the sub-base, a back edge and a front edge, the plurality of ground pads extending from the front edge of the first rail segment; and
the overhang comprises:
a second rail segment having a bottom edge and a top edge, the bottom edge of the second rail segment being connected to the top surface of the first rail segment at the back edge of the first rail segment;
a third rail segment extending substantially parallel to the first rail segment from the second rail segment in the same direction as the plurality of ground pads; and
a fourth rail segment extending from the third rail segment towards the floor and extending substantially parallel to the second rail segment;
the plurality of ground pads being spaced apart from one another and mounted to the longitudinal housing, the longitudinal gap and the plurality of ground pads being on the same side of the longitudinal housing, each of the plurality of ground pads having a bottom surface contacting the sub-base and a top surface facing away from the sub-base and contacting the underside of the artificial turf, the artificial turf being fastened to the sub-base through the plurality of ground pads;
wherein the outer edge of the artificial turf passes through the longitudinal gap and is hidden in the longitudinal channel under the overhang, the turf blades at the outer edge of the artificial turf extending from the topside of the artificial turf into the longitudinal channel.

16. The artificial turf edging system of claim 15, wherein the longitudinal channel has a vertical cross-section of a substantially discontinuous rectangular shape.

17. The artificial turf edging system of claim 15, wherein the height of the longitudinal channel is more than four times the height of the longitudinal gap, and the longitudinal gap is sized to allow the outer edge of the artificial turf to extend through the longitudinal gap and to hide the outer edge of the artificial turf in the longitudinal channel under the overhang.

18. The artificial turf edging system of claim 15, wherein:
the third rail segment comprises a back edge and a front edge, the back edge of the third rail segment being connected to the top edge of the second rail segment; and
the fourth rail segment having a bottom edge and a top edge, the top edge of the fourth rail segment being connected to the front edge of the third rail segment, the longitudinal gap being formed between the bottom edge of the fourth rail segment and the top surface of the first rail segment.

19. The artificial turf edging system of claim 18, wherein the first rail segment and the plurality of ground pads are both substantially in a first plane.

20. The artificial turf edging system of claim 17, wherein the third rail segment is in an elevated plane above and substantially parallel to the first plane.

21. The artificial turf edging system of claim 20, wherein the second rail segment is in a second plane and the fourth rail segment is in the overhang plane, the second plane and the overhang plane being substantially parallel, and the second plane and the overhang plane being substantially perpendicular to the first plane and the elevated plane.

22. The artificial turf edging system of claim 18, further comprising a fifth rail segment having a bottom edge and a top edge, the top edge of the fifth rail segment being connected to the bottom surface of the first rail segment at the back edge of the first rail segment, the fifth rail segment being substantially in the second plane.

23. The artificial turf edging system of claim 15, wherein the outer edge of the artificial turf slidably passes through the longitudinal gap.

24. The artificial turf edging system of claim 15, wherein the artificial turf is only fastened to the divider through the plurality of ground pads.

* * * * *